Sept. 17, 1957      G. R. THOEMING      2,806,698
HOBBY HORSE WITH STIRRUPS
Filed July 19, 1956
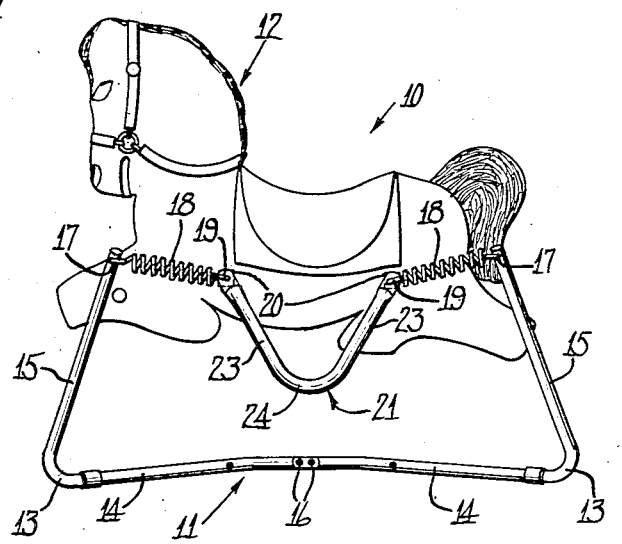
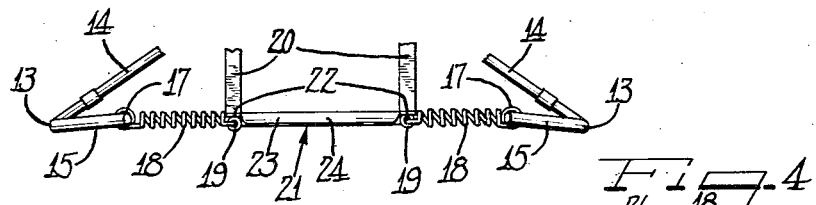
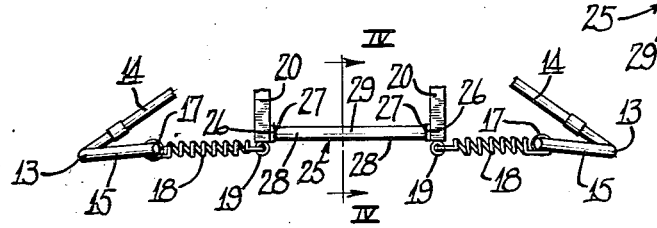
Inventor
George R. Thoeming United States Patent Office 2,806,698
Patented Sept. 17, 1957

2,806,698

HOBBY HORSE WITH STIRRUPS

George R. Thoeming, Collierville, Tenn., assignor to Wonder Products Company, Collierville, Tenn., a corporation of Tennessee Application July 19, 1956, Serial No. 598,958

5 Claims. (Cl. 272—52)

The present invention relates to a spring suspended hobby horse construction and more particularly to a construction of this type in combination with a stirrup bracing member.

In recent years spring suspended hobby horses have become extremely popular. These hobby horses generally have a toy horse-like body with suspension bars projecting laterally from the body. Suspending springs are then hooked to the suspension bars and to the upstanding legs of a base stand. This arrangement permits a child rider seated upon the horse to experience resilient motion forwardly, rearwardly, upwardly, downwardly and to both sides. The motion can be made to formulate the actual horseback riding movements and is much more desirable than the old fashion looking horse type hobby horse.

While some of the hobby horse bodies are made of materials such as wood, there have been created more realistic looking horses such as those constructed from molded plastic. The molded plastic horses have, therefore, proved to be extremely popular and have had great success in the market place.

Some difficulties with the plastic body hobby horses of this type have been experienced due to various possibilities such as cracking or checking of the horse as well as cold flow thereof. The problem of plastic cold flow in these hobby horses has resulted from the spring pressure on the suspension bars that pass through the horse body. The spring force usually ranges from about 15 pounds under static conditions to about 35 pounds per spring under dynamic conditions.

By the present invention there is provided a bracing stirrup structural member which interconnects the suspension bars on each side of the hobby horse to relieve spring force on the horse itself and thereby prevents cold flow and possible fracture of the horse.

The invention also serves to overcome the problem of any possible fractures of the horse with a resultant of falling or dropping of the child rider due to cracking or checking of the plastic body from internal stress or external deliberate or accidental damage. A plastic horse will be prevented from breaking open while being ridden since the stresses thereon will be held to a minimum by this invention.

The stirrup construction and combination with the hobby horse of this invention also is effective to provide an improved mounting means for the child rider since the stirrup bracing members are provided with an arcuate depending configuration thereby providing a convenient stirrup mounting arrangement.

These and numerous other features and advantages of this invention will become readily apparent to those skilled in the art and others from the following detailed description of the invention and embodiments thereof, from the claims, and from the accompanying drawings in which each and every detail shown is fully and completely disclosed as a part of this specification, in which like reference numerals refer to like parts, and in which:

Figure 1 is an elevational view of a spring suspended hobby horse and stirrup arrangement embodying the principles of this invention;

Figure 2 is a fragmental plan view of the suspension bars, supporting legs, springs and stirrups on one side of the hobby horse of Figure 1;

Figure 3 is a fragmental plan view like Figure 1 but of another embodiment of the invention; and Figure 4 is a sectional view of the embodiment of Figure 3 viewed as taken along the line IV—IV of Figure 3.

In Figure 1 there is illustrated a spring suspended hobby horse assembly 10 having a base stand 11 resiliently supporting a toy horse-like body member 12. The base stand in this embodiment of this invention has four symmetrical units 13—13, only two of which are seen in Figure 1, each of which has a floor engaging portion 14—14 and each of which has an upstanding leg 15—15. The four floor engaging portions are secured together by such convenient means as bolts 16 in such a manner that the upstanding legs 15—15 are disposed in quadrature.

Near the upper end of each of the legs 15 they are provided with hook rings 17—17 respectively for convenient connection with suspension springs 18—18. The springs are provided with hook-like ends that hook onto the hook rings 17 at one end of each of the springs. The other end of each of the springs hooks into a screw eye 19—19 respectively screwed into the ends of a pair of suspension bars 20—20. These bars pass through the hobby horse body 12 and extend laterally therefrom. Thus the springs 18 hook onto each end of both of the suspension bars and further hook onto the four legs 15—15 thereby resiliently supporting the hobby horse body 12 of the base stand 11.

The spring force of each of these springs will generally range from about 15 pounds per spring under static conditions to about 35 pounds per spring under dynamic conditions and may cause cold flow of the hobby horse body, when the hobby horse body is formed of a molded plastic material, or create substantial stresses and strains in the hobby horse body. The present invention provides a stirrup structural bracing arrangement operative to relieve the stresses and strains and to prevent cold flow of the plastic body of the horse. Thus, in the embodiment of the invention illustrated in Figures 1 and 2 a structural stirrup member 21, formed of a substantially rigid and strong material such as tubular steel, as an example, is secured between the suspension bars 20 on each side of the hobby horse. The stirrup member 21, in Figures 1 and 2, is provided with flattened ends 22—22 which are appropriately apertured to receive the screw eyes 19—19 therethrough. With this arrangement the stresses and strains to which the hobby horse body is normally subjected from the springs 18 are relieved by and taken up by the stirrup members 21—21. These stirrup members will also prevent any stress breaking of the hobby horse body 12 under dynamic conditions even when the cracking or checking was created through externally applied forces.

The stirrup member 21 of Figures 1 and 2 is also operable as a stepping mounting stirrup to assist the child rider of the horse in mounting the hobby horse body 12. For this purpose the stirrups 21 are dependently arcuate in configuration so that they have depending arms 23 joined in a curved section 24 in the lowermost region thereof. This arrangement enables a child to step onto the lowermost portion 24 of the stirrup as a step mounting aid.

In the embodiment of the invention illustrated in Figures 3 and 4 the stirrup is indicated generally at 25 while all the remaining portions of the general arrangement shown in those figures are the same as in Figures 1 and 2 and are indicated by the same reference numerals. The stirrup 25, however, is provided with flattened ends 26—26 so they are secured as by screws 27—27 to the side faces of the suspension bars 20—20 inwardly of the ends thereof where the screw eyes 19—19 are fastened yet outwardly from the horse body 12. The stirrup base member 25 is like the stirrup base member 21 of Figures 1 and 2 inasmuch as it is also formed of substantially rigid, strong materials and has herein been shown as being formed of a tubular iron or steel material. Additionally, the stirrup member 25 is otherwise generally configurated substantially the same as the stirrup member 21 in that it is also provided with depending arms 28—28 and an arcuate joining portion 29 in the lowermost portion thereof, thereby providing step mounting aid for the child rider as well as a structural brace.

From the foregoing it will be readily observed that numerous variations and modifications may be made without departing from the true spirit and scope of the novel concepts and principles of this invention. I, therefore intend to cover all such modifications and variations as may fall within the true spirit and scope of the novel concepts and principles of this invention.

I claim as my invention:

1. A spring suspended device comprising a hollow plastic body member, a pair of suspension bars each laterally projecting through each side of the body member, a base stand including floor engaging portions and upstanding leg portions disposed in quadrature, springs respectively interconnecting the leg portions with the suspension bars, and a pair of rigid stirrup elements respectively secured to and interconnecting each end of the suspension bars on each side of the body.

2. A spring suspended hobby horse comprising a horselike plastic body member, a pair of suspension bars each laterally projecting through each side of the body member, a base stand including floor engaging portions and upstanding leg portions disposed in quadrature, springs respectively interconnecting the leg portions with the suspension bars, and a pair of rigid stirrup elements respectively secured to and interconnecting each end of the suspension bars on each side of the body, said rigid stirrup elements having an arcuate configuration depending from the suspension bars whereby they are effective as structural bracing members and as stirrup-like mounting members.

3. A spring suspended hobby horse comprising a horselike plastic body member, a pair of suspension bars each laterally projecting through each side of the body member, a base stand including floor engaging portions and upstanding leg portions disposed in quadrature, springs respectively interconnecting the leg portions with the suspension bars, and a pair of rigid stirrup elements respectively secured to and interconnecting each end of the suspension bars on each side of the body, said rigid stirrup elements being secured to said suspension bars at the ends of the suspension bars.

4. A spring suspended hobby horse comprising a horselike plastic body member, a pair of suspension bars each laterally projecting through each side of the body member, a base stand including floor engaging portions and upstanding leg portions disposed in quadrature, springs respectively interconnecting the leg portions with the suspension bars, and a pair of rigid stirrup elements respectively secured to and interconnecting each end of the suspension bars on each side of the body, said rigid stirrup elements being secured to said suspension bars inwardly of the ends thereof and outwardly from the body member.

5. A spring suspended hobby horse comprising a horselike plastic body member, a pair of suspension bars each laterally projecting through each side of the body member, a base stand including floor engaging portions and upstanding leg portions disposed in quadrature, springs respectively interconnecting the leg portions with the suspension bars, and a pair of rigid stirrup elements respectively secured to and interconnecting each end of the suspension bars on each side of the body, said rigid stirrup elements having an arcuate configuration depending from the suspension bars whereby they are effective as structural bracing members and as stirrup-like mounting members, said rigid stirrup elements being secured to said suspension bars at the ends of the suspension bars, at the ends of the springs.

References Cited in the file of this patent

UNITED STATES PATENTS

| | | |
|---|---|---|
| 2,662,878 | Mooney | Dec. 23, 1952 |
| 2,625,395 | Spangler | Jan. 13, 1953 |
| 2,756,051 | Shone | July 24, 1956 |
| 2,758,632 | Koller et al. | Aug. 14, 1956 |